United States Patent
Blatter et al.

[11] Patent Number: 5,859,175
[45] Date of Patent: Jan. 12, 1999

[54] PROCESS FOR THE PREPARATION OF POLYETHER AMIDE SOLUTIONS, STEAM-STERILIZABLE DIALYSIS MEMBRANES OBTAINABLE USING THE POLYETHER-AMIDE SOLUTIONS, AND A PROCESS FOR THE PRODUCTION OF THESE MEMBRANES

[75] Inventors: Karsten Blatter, Eppstein; Reinhard Wagener, Flörsheim; Carl Martin Bell, Hechingen; Hermann Josef Göhl, Bisingen, all of Germany

[73] Assignee: Hoechst Aktiengesellschaft, Frankfurt, Germany

[21] Appl. No.: 771,230

[22] Filed: Dec. 20, 1996

[30] Foreign Application Priority Data

Dec. 28, 1995 [DE] Germany .................. 195 49 001.0

[51] Int. Cl.⁶ .................. C08G 69/26; C08G 73/10
[52] U.S. Cl. .................. 528/310; 528/322; 528/332; 528/335; 528/336; 528/368; 264/41; 264/49; 264/204; 264/344; 210/490; 210/492; 210/500.38
[58] Field of Search .................. 210/490, 500.38, 210/492; 264/49, 204, 344, 41; 528/368, 310, 322, 332, 336, 335

[56] References Cited

U.S. PATENT DOCUMENTS

| | | | |
|---|---|---|---|
| 4,900,443 | 2/1990 | Wrasidlo | 210/490 |
| 5,152,894 | 10/1992 | Haubs et al. | 210/500.38 |
| 5,562,826 | 10/1996 | Schneider et al. | 210/490 |

FOREIGN PATENT DOCUMENTS

| | | |
|---|---|---|
| 0068459 | 1/1983 | European Pat. Off. . |
| 0382009 | 8/1990 | European Pat. Off. . |
| 0543171 | 5/1993 | European Pat. Off. . |
| 2225735 | 5/1974 | Germany . |
| 3936785 | 11/1989 | Germany . |

OTHER PUBLICATIONS

E. Wetzels et al., "Hämodialyse, peritonediaylse, Membranplasmaphorese und verwandt Verfahren", Springer Verlag, 3. Auflage, 1986, list of contents.

Wallhäusser, "Praxis der Sterlisation, Desinfektion, Konservierung", 3. Auflage, Thieme Verlag, 1981, list of contents.

"Polyamide — The evolution of a Synthetic Membrane for Renal Therapy" ed. by S. Shaldon et al., contribution to Nephrology Nr. 96, Karger Verlag, 1992.

Primary Examiner—P. Hampton-Hightower
Attorney, Agent, or Firm—Frommer Lawrence & Haug LLP

[57] ABSTRACT

Process for the preparation of polyether-amide solutions, steam-sterilizable dialysis membranes obtainable using the polyether-amide solutions, and a process for the production of these membranes.

Polycondensation of one or more dicarboxylic acid derivatives of the formula I

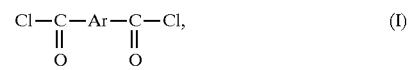

with one or more aromatic diamines of the formula II

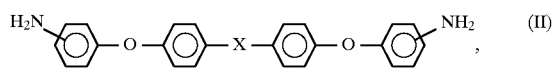

and, if appropriate, m-phenylenediamine, in aprotic polar solvents is known.

As a result of passing ammonia, in an amount sufficient to neutralize the HCl formed, into the polymer solution obtained after the end of the polycondensation and filtering off the ammonium chloride formed, it is possible to prepare neutral, salt-free and particularly storage-stable polyether-amide solutions which can be further processed to membranes without isolation of the polymer. The resulting membranes are steam-sterilizable, chemically and thermally stable and show efficiency data in the region of that of good high-flux dialysis membranes.

Flat and hollow fiber membranes for ultrafiltration.

14 Claims, No Drawings

PROCESS FOR THE PREPARATION OF POLYETHER AMIDE SOLUTIONS, STEAM-STERILIZABLE DIALYSIS MEMBRANES OBTAINABLE USING THE POLYETHER-AMIDE SOLUTIONS, AND A PROCESS FOR THE PRODUCTION OF THESE MEMBRANES

DESCRIPTION

Process for the preparation of polyether-amide solutions, steam-sterilizable dialysis membranes obtainable using the polyether-amide solutions, and a process for the production of these membranes.

The invention relates to a process for the preparation of polyether-amide solutions, the use of these solutions, dialysis membranes of polyether-amide, which can optionally comprise further polymers as blend components, and their production from polyether-amide solutions.

The invention particularly relates to a process for the preparation of polyether-amide solutions in which one or more dicarboxylic acid derivatives of the formula I

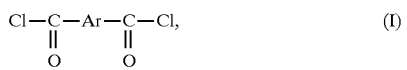 (I)

in which

Ar is a divalent, aromatic or heteroaromatic radical, the two carbonyl groups being on non-adjacent ring carbon atoms, i.e. not being in the ortho-position relative to one another, and the Ar radical is optionally substituted by one or two branched or unbranched radicals from the group consisting of $C_1$–$C_3$-alkyl, $C_1$–$C_3$-alkoxy, aryl, aryloxy, $C_1$–$C_6$-perfluoroalkyl and $C_1$–$C_6$-perfluoroalkoxy radicals, fluorine, chlorine, bromine and/or iodine, are subjected to a polycondensation reaction with one or more aromatic diamines of the formula II

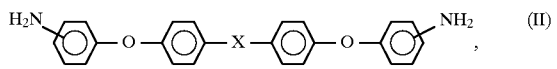 (II)

in which

X is a group —C(CH$_3$)$_2$—, —C(CF$_3$)$_2$, —CO—, —SO—, —SO$_2$—, —CH$_2$—, —S—, or —O— or a direct bond, and optionally m-phenylenediamine, in aprotic polar solvents.

Membranes are currently widely used in blood treatment processes, such as hemodialysis or plasmaphoresis. A large number of membrane materials are employed here, as described in: E. Wetzels, A. Colombi, P. Dittrich, H. J. Gurland, M. Kessel, H. Klinkmann in "Hämodialyse, Peritonealdialyse, Membranplasmaphorese und verwandte Verfahren" [Hemodialysis, peritoneal dialysis, membrane plasmaphoresis and related processes], Springer Verlag, 3rd Edition (1986).

The membrane materials can be classified on the one hand as membranes built up from synthetic polymers, and on the other hand as membranes produced from cellulosic polymers, such as, for example, Cuprophan. The membranes are employed here both in hollow fiber modules and in a flat membrane configuration. An improved blood tolerability, for example lower complement activation, compared with membranes produced from cellulosic materials is discussed for membranes of synthetic polymers.

Sterilization with ethylene oxide is chiefly used at present as the sterilization process for synthetic membranes. As an alternative to this, steam sterilization (20 minutes at 121° C. in saturated steam) or sterilization at elevated temperature is employed (cf. K. H. Wallhäußer, "Praxis der Sterilisation, Desinfektion, Konservierung" [Practice of sterilization, disinfection and preservation], 3rd Edition, Thieme Verlag, 1981). The sterilization of polysulfone membranes with hot water is described, for example, in the patent DE 3936785.

Dialysis membranes of synthetic polymers often comprise a further hydrophilic component, in addition to the structure-forming and stabilizing polymer component, and are thus built up in the form of a blend or as a copolymer. Polyvinylpyrrolidone (PVP) or polyethylene glycol (PEG) are examples of hydrophilic components. The membrane must then be produced with a fine structure such that sterilization does not adversely change this structure and therefore the properties.

Polyamide membranes nowadays occupy a prominent position in dialysis, hemodiafiltration and hemofiltration. This is to be attributed to their good efficiency and their blood tolerability (cf. "Polyamide—The Evolution of a Synthetic Membrane for Renal Therapy", edited by S. Shaldon, K. M. Koch, contribution to Nephrology No. 96, Karger Verlag 1992).

The use of polyether-amides for the production of membranes for industrial applications is already known.

The following publications are mentioned regarding the closest prior art:
EP-A-0 543 171=D1,
EP-A-0 382 009=D2,
US 4,900,443=D3,
EP-A-0 068 459=D4 and
DE-A-22 25 735=D5.

D1 describes the advantages of asymmetric porous membranes of aromatic polyether-amides or polyaramids compared with other membrane materials, such as cellulose or polyether-sulfone. If hydrophilic polymers which mix homogeneously with polyaramids, such as, for example polyvinylpyrrolidone (PVP) or polyethylene glycol (PEG), are added to solutions of polyether-amides before the phase inversion, membranes of high hydrophilicity can be obtained (D2).

The use of polyether-amide solutions which are obtained directly by reaction of the corresponding monomers in the solvent suitable for membrane production is particularly advantageous industrially for membrane preparation. In this case, expensive isolation of the polymer can be omitted.

In this context, D1 discloses the reaction of aromatic di-acid chlorides with aromatic diamines to give polyaramids or polyether-amides in polar aprotic solvents, such as N-methylpyrrolidone or dimethylacetamide. If appropriate, a salt, such as, for example, calcium chloride, is additionally added before the reaction to improve the solubility. During the reaction of the di-acid chloride and diamine, hydrochloric acid is liberated, this being bonded only loosely to the basic solvent and, without subsequent neutralization, leading to severe corrosion of plant components and to hydrolysis of the polyaramid formed.

This industrial problem has been solved to date by addition of strong inorganic bases, such as lithium hydroxide or calcium oxide. The salts formed by reaction of these bases with the hydrochloric acid (lithium chloride or calcium chloride) are readily soluble in the solvents chosen and remain in the polyaramid solution. In typical examples, the salt concentration of a finished polyaramid solution (polymer concentration of 10%) is between 1 and 5%, depending on the structure of the monomers used. For many polyaramid structures, this salt content is necessary to increase the solubility, since otherwise no stable solutions can be obtained. Addition of a salt to casting solutions of polyaramids is also known.

In this connection, D3 proposes the use of an inorganic solubility-improving agent in salt form. D3 lists halides, nitrates, sulfates and/or perchlorates of the alkali metals or alkaline earth metals, preferably LiCl.

The presence of salts in the polyaramid solutions used for membrane production also has an influence on the membrane properties. D4 describes an addition of hydrated magnesium chloride with 6 mol of water of hydration to a casting solution for production of membranes from a film- and fiber-forming polyaramid. However, the membrane properties are not necessarily changed in the desired direction by the addition of a salt. Thus, for example, an addition of LiCl can lower the heat stability of the resulting membranes.

If the salt-containing polyaramid solutions available according to the prior art are used for the production of membranes by the phase inversion process, the salts must be washed out of the membrane after coagulation of the polyaramid solution in a non-solvent, such as, for example, water. This operation is associated with considerable expense, especially if the lowest possible salt content of the finished membrane is to be achieved for applications in the medical sector, such as, for example, for use as a dialysis membrane.

According to the prior art (D5), salt-free polyether-amide solutions can be obtained by redissolving precipitated, washed and dried poly(ether)-amide powder. This process is expensive and in general is associated with the consumption of considerable quantities of solvent for rinsing and of washing water.

In view of the prior art mentioned and discussed here, it was consequently an object of the invention to provide a further process for the preparation of polyether-amide solutions which are salt-free or have the lowest possible salt content.

Another object of the invention was to provide storage-stable solutions of polyaramids or polyether amides from which membranes can be produced.

A further subject of the invention is a steam-sterilizable dialysis membrane with good blood tolerability and high selectivity.

Another object of the invention is to provide a process for the production of a steam-sterilizable dialysis membrane with a good blood tolerability and high selectivity.

These and other objects in respect of provision of polyether-amide solutions which are as salt-free as possible, which are not described in more detail, are achieved in a process of the abovementioned type by the features of the characterizing part of claim 1. Expedient modifications to the process are protected in the claims which refer back to claim 1.

Passing ammonia, in an amount sufficient to neutralize the HCl formed, into the polymer solution obtained after the end of the polycondensation and filtering off the ammonium chloride formed makes it possible to prepare neutral polyether-amide solutions
which are salt-free,
which are storage-stable,
which are present as a homogeneous solution even in a high concentration and
which can be further processed to membranes without isolation of the polymer.
The resulting membranes futhermore have unexpectedly advantageous properties.

The neutralization of the polycondensation solution by directly passing gaseous ammonia into the hydrochloric acid reaction solutions described above is particularly advantageous here, compared with the prior art (D1 and D5), since, above all, it bypasses expensive isolation of the polymer as a powder.

The hydrochloric acid is neutralized to ammonium chloride, which is virtually insoluble in polar aprotic solvents such as N-methylpyrrolidone or N,N-dimethylacetamide and can be removed by simple filtration.

The solubility of ammonium chloride is significantly below 0.1%, so that this salt can be essentially removed by simple filtration.

The insolubility of ammonium chloride in the solvents N-methylpyrrolidone or N,N-dimethylacetamide has already been employed for reducing the salt content of poly-meta-phenyleneisophthalamide solutions for the production of fibers (U.S. Pat. No. 4,389,521). However, a significant residual content of several percent of soluble salts, such as, for example, potassium chloride was necessary. In contrast, no stable solutions of poly-meta-phenyleneisophthalamide in N-methylpyrrolidone were obtained without this addition of a salt.

In spite of the considerable expense of a two-stage polycondensation with additional working up steps, it was consequently not possible to adjust the salt content of the solutions as desired by this method, and in particular a salt content of zero or virtually zero was excluded.

On the other hand, the polyaramid solutions according to the invention are obtainable in high concentrations in the desired solvents without any addition of a salt, and a two-stage neutralization to form soluble salts is superfluous.

In a preferred embodiment of the invention, terephthalic acid dichloride and/or isophthalic acid dichloride are employed as compounds of the formula I. Preferred substances of the formula II are, inter alia, 2,2'-bis[4-(4'-aminophenoxy)phenyl]propane, bis[3-(3'-aminophenoxy) phenyl]sulfone, bis[4-(4'-aminophenoxy)-phenyl]sulfone, bis[4-(4'-aminophenoxy)phenyl]methane and/or 2,2 '-bis[4-(4'-aminophenoxy)phenyl]hexafluoropropane.

Up to 50 mol % of the aromatic diamines of type II can be replaced by m-phenylenediamine.

Polymer solutions are especially preferably prepared as polycondensates of terephthalic acid dichloride and isophthalic acid dichloride as the dicarboxylic acid dichlorides and 2,2'-bis[4-(4'-aminophenoxy)phenyl]propane as the amine component, and, furthermore, a content of less than 50 mol % of the amine component mentioned is preferably replaced by m-phenylenediamine.

The solution condensation of aromatic dicarboxylic acid chlorides of the formula I with aromatic diamines of the formula II and, where appropriate, m-phenylenediamine and/or diamines of the formula III is carried out in aprotic polar solvents, preferably of the amide type. The solvents N-methyl-2-pyrrolidone (NMP) or N,N-dimethylacetamide or mixtures thereof are particularly favorable.

The polycondensation temperatures are usually between $-20°$ C. and $+120°$ C., preferably between $+10°$ C. and $+100°$ C. Particularly good results are achieved at reaction temperatures between $+10°$ C. and $+80°$ C.

The polycondensation reactions are preferably carried out and the amount of monomers to be subjected to polycondensation chosen such that, when the reaction has ended, the concentration of the polymer in the solution is between 3 and 50% by weight. Preferably, between 5 and 35% by weight of polycondensate is present in the solution.

The polycondensation can be stopped in the customary manner, for example by addition of monofunctional compounds, such as benzoyl chloride. When the polycondensation has ended, i.e. when the polymer solution has achieved the limiting (intrinsic) viscosity number necessary for further processing, the hydrogen chloride formed, which is bonded to the amide solvent, is neutralized by passing in ammonia. After the neutralization, the solutions are filtered and, if appropriate, degassed and are thus storage-stable for several weeks without their important properties in respect of membrane production changing. The concentration of the solutions and the molecular weight of the polymer (limiting viscosity number), as important parameters which influence membrane properties such as porosity, mechanical stability, permeability and retention capacity, remain essentially unchanged.

In particular, the polyether-amides prepared according to the invention surprisingly ensure here the availability of highly concentrated solutions without addition of a salt. Concentrations of, for example, 24% in polar aprotic solvents, such as, N-methylpyrrolidone or dimethylacetamide, are possible without problems.

The polyether-amides obtained according to the process of the invention have a limiting viscosity number of 0.5 to 5 dl/g (measured in N-methyl-pyrrolidone with the addition of 0.05% of LiBr), preferably between 0.8 and 2.0 dl/g). In contrast to other known processes (melt process for the preparation of polyether-amides), the preferred range is reached here without problems. The higher molecular weights (corresponding to higher limiting viscosity numbers (>about 0.8 dl/g )) particularly advantageously promote film-forming processes for the production of membranes. For such an application, the higher molecular weight in fact leads to a faster processing (spinning) rate.

It has furthermore been found that the novel salt-free solutions of polyaramids have a significantly lower viscosity compared with solutions of the same concentration which comprise stoichiometric amounts of a salt, such as, for example, calcium chloride, such as are obtained on neutralization of polycondensation solutions with, for example, calcium oxide (Example 2). The low viscosity has very great advantages for the production of hollow fiber membranes, since higher polymer concentrations can also still be processed without problems, and as a result shorter filtration times for the solutions and higher spinning rates can be realized during industrial hollow fiber production. (Table 5)

The resulting solutions can be particularly advantageously further processed after filtration without isolation of the polymer.

On the basis of these advantages, the polyether-amide solutions prepared in the invention are particularly suitable for the production of semipermeable, porous, asymmetric membranes. Their use for the production of flat membranes is favorable. The production of hollow fiber membranes is especially preferred.

The invention accordingly also relates to a membrane which is built up from a polyamide, in particular polyether-amide, which has the required heat stability and at the same time has the good blood tolerability properties of polyamide. In particular, the membrane is a semipermeable, porous, asymmetric membrane comprising a polyaramid containing, as structural repeating units, one or more structural units of the formula I'

(I')

in which

Ar is a divalent, aromatic or heteroaromatic radical, the two carbonyl groups being on non-adjacent ring carbon atoms, i.e. not being in the ortho-position relative to one another, and the Ar radical is optionally substituted by one or two branched or unbranched radicals from the group consisting of $C_1$–$C_3$-alkyl, $C_1$–$C_3$-alkoxy, aryl, aryloxy, $C_1$–$C_6$-perfluoroalkyl and $C_1$–$C_6$-perfluoroalkoxy radicals, fluorine, chlorine, bromine and/or iodine, and, based on the sum of (II') and (III'), to the extent of 50 to 100 mol %, structural units of the formula (II')

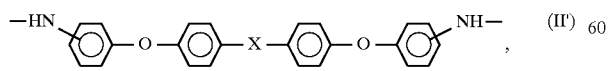
(II')

in which

X is a group —C(CH$_3$)$_2$—, —C(CF$_3$)$_2$, —CO—, —SO—, —SO$_2$—, —CH$_2$—, —S—, or —O— or a direct bond, and, based on the sum of (II') and (III'), to the extent of 0 to 50 mol %, structural units of the formula (III')

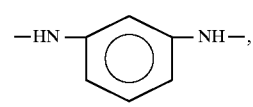

the membrane being obtained by the phase inversion process, in which a homogeneous polymer solution is brought into contact with a precipitating bath containing a precipitating liquid, the precipitating liquid being miscible with the solvent of the polymer solution and the polymers dissolved in the polymer solution being precipitated as a membrane, and the polymer solution having a chloride content of less than 0.1% by weight, based on the total weight of the polymer solution.

In the structural units of the formula I', as in the above-mentioned compounds of the formula I, Ar is a divalent, aromatic or heteroaromatic radical. In the context of the invention, this particularly preferably includes the following radicals:

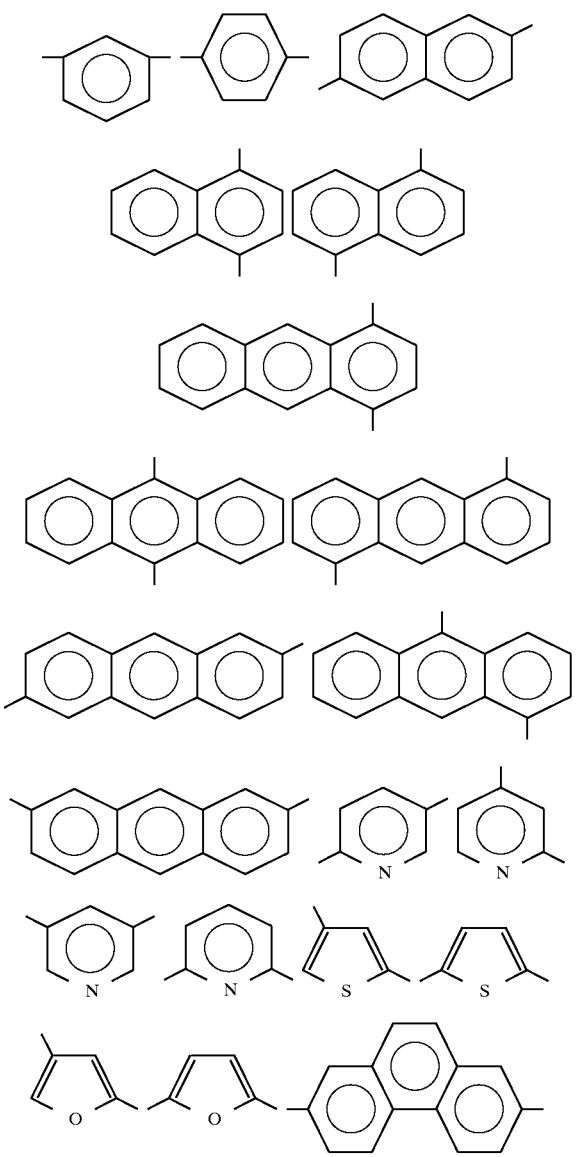

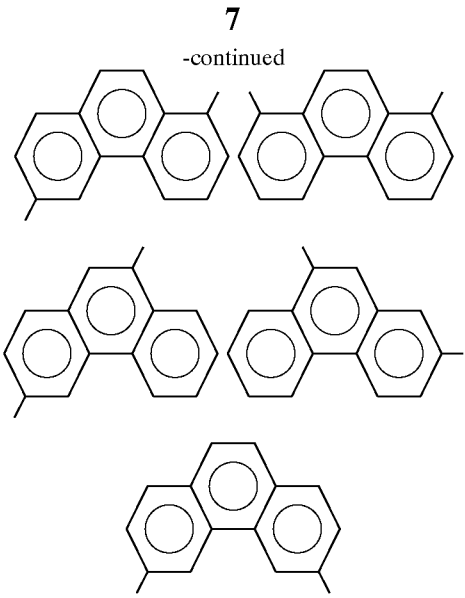

In a preferred embodiment, the membrane according to the invention is arranged on a support layer which is made of a synthetic nonwoven and is permeable to media which are capable of flow, or on a fabric.

The membrane of the invention is furthermore preferably constructed as a hollow fiber membrane.

The solvents N-methylpyrrolidone or dimethylacetamide usually used in the preparation of the polyaramids are also particularly preferably employed for the production of membranes. This means that the polymer isolated in an expensive manner from NMP or dimethylacetamide is subsequently dissolved again in just these solvents. This step is omitted if solutions according to the invention are employed.

The invention therefore also relates to a process for the production of a semipermeable, porous, asymmetric membrane, in which a solution comprising a polymer of at least one polyamide containing, as structural repeating units, one or more structural units of the formula I'

in which

Ar is a divalent, aromatic or heteroaromatic radical, the two carbonyl groups being on non-adjacent ring carbon atoms, i.e. not being in the ortho-position relative to one another, and the Ar radical is optionally substituted by one or two branched or unbranched radicals from the group consisting of $C_1$–$C_3$-alkyl, $C_1$–$C_3$-alkoxy, aryl, aryloxy, $C_1$–$C_6$-perfluoroalkyl and $C_1$–$C_6$-perfluoroalkoxy radicals, fluorine, chlorine, bromine and/or iodine, and, based on the sum of (II') and (III'), to the extent of 50 to 100 mol %, structural units of the formula (II')

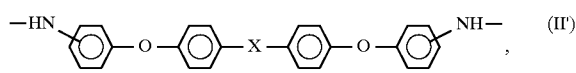

in which

X is a group —C(CH$_3$)$_2$—, —C(CF$_3$)$_2$, —CO—, —SO—, —SO$_2$—, —CH$_2$—, —S—, or —O— or a direct bond, and, based on the sum of (II') and (III'), to the extent of 0 to 50 mol %, structural units of the formula (III')

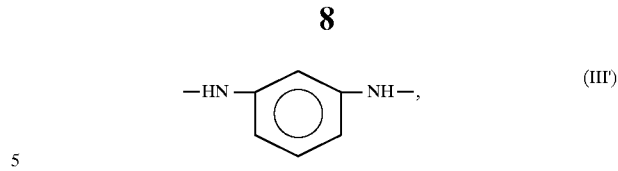

is brought into contact with a precipitating bath containing a precipitating liquid, the precipitating liquid being miscible with the solvent of the polymer solution and the polymers dissolved in the polymer solution being precipitated as a membrane, where the process comprises employing a solution according to the invention obtained by polycondensation as the polymer solution.

If appropriate, customary additives, such as PEG or PVP, are added to the polymer solution.

In a preferred modification of the process, the solution resulting from the polycondensation is used for membrane production by the phase inversion process without isolation of the polymer.

In the phase inversion technique (cf. R. E. Kesting, "Synthetic Polymeric Membranes", 2nd Edition, 1985), a membrane is precipitated from a polymer solution comprising a solvent such as N-methylpyrrolidone (NMP) or dimethylacetamide (DMAc) or mixtures thereof, the polyetheramide and furthermore hydrophilic components, such as, for example PVP or PEG. The homogeneous solution is passed through an annular die (in the case of hollow fibers) or a slot die (in the case of flat membranes) into a rinsing or precipitating bath. Possible non-solvents are all liquids which are completely miscible with the solvent (NMP or DMAc). These are, for example, water, mono- or polyhydric alcohols, organic solvents, such as acetone, or mixtures of these solvents with one another or with the solvent. Water or a mixture of water and NMP or DMAc, together with PVP or PEG, are preferably employed here. The pore morphology of the membrane, which contributes toward determining the efficiency of the membrane, its steam-sterilizability and its blood tolerability, can be adjusted by specific combination of the polyether-amide, hydrophilic component and nonsolvent system and of the spinning parameters of temperature and pressure.

The concentration of polyether-amide in the spinning solution for the abovementioned molecular weights is 5–25% by weight, and the concentration for the hydrophilic component is 0 to 20% by weight. The non-solvent system is composed of water with 0 to 60% by weight of solvent and 0 to 10% of hydrophilic component. Asymmetric membranes are produced as described in EPA 0 305 787 A1.

With the asymmetrically built-up 3-layer structure (such as is shown in principle in EP-A-0 305 787 in FIGS. 1 and 2) with the tiniest pore diameters on the membrane surface, a separation efficiency of the membrane which is constant over the dialysis treatment time is ensured, i.e. it ensures a removal of the uremic toxins and molecules of average molecular weight up to about 50,000 daltons, such as, for example, b2-microglobulin or factor D, which is constant over time.

The first layer on the hollow fiber side which comes into contact with the blood comprises a very thin skin on which separation according to molecular size takes place. As a result, the separation takes place on the surface, and not within the membrane, so that no proteins can penetrate into the membrane. The second intermediate layer comprises a porous foam structure about 10 mm thick, which stabilizes the first layer and is distinguished by a minimal diffusive and convective flow resistance.

The third layer, which makes up 80% of the membrane thickness, provides high mechanical stability and, due to minimal convective and diffusive resistance coupled with a large-pore outer surface, allows rapid removal of the molecules separated off into the dialysate circulation.

Dialysis membranes produced in this manner have a chemical and heat stability which is adequate for carrying out steam sterilization (121° C., 20 minutes), and show membrane efficiency data which lie in the region of good high-flux dialysis membranes.

The following examples are intended to illustrate the dialysis membranes according to the invention and the process for their production in more detail:

EXAMPLE 1

Preparation of salt-free polyether-amide solutions

The diamines are dissolved in the amounts stated in Table 1 in N-methylpyrrolidone at 20° C. in a stainless steel reactor with a spiral stirrer. The corresponding amounts of terephthalic acid dichloride or isophthalic acid dichloride (cf. table) are metered as quickly as possible into this solution. A spontaneous increase in temperature to 40°–60° C. and an increase in viscosity are observed. When the viscosity has reached its maximum value, the amino end groups still present are blocked by addition of stoichiometric amounts of benzoyl chloride. The mixture is allowed to after-react for a further 15 minutes and the HCl formed is then neutralized by passing in gaseous ammonia at temperatures between 40° and 110° C. As a result of the heat of neutralization, the temperature of the reaction solution increases noticeably. When the exothermic reaction has subsided, residual ammonia contained in the solution is displaced by nitrogen and the ammonium chloride which has precipitated out is then filtered off over a fine fabric filter. Analysis of the solutions for residual content of chloride ions shows a content of $\propto 0.1\%$ of chloride.

Clear, stable solutions (for the analytical data, cf. Table 1) which are storage-stable for several weeks and can be processed directly—if appropriate after dilution and addition of polyvinylpyrrolidone or polyethylene glycol—to dialysis membranes are obtained.

EXAMPLE 2

Influence of the salt content on the solution viscosity of polyether-amide solutions.

The viscosity of a 19.7% strength solution of polymer 1 with a limiting viscosity number of 1.15 dl/g in N-methylpyrrolidone is 79,000 mPas at 25° C. In contrast, an analogous solution which comprises an amount of calcium chloride (4.1%) obtained by stoichiometric neutralization with calcium oxide has a viscosity of 112,000 mPas.

If 3% of calcium chloride is added to the solution of polymer 2 (Example 1), the viscosity rises from 13,340 to 16,200 mPas.

EXAMPLE 3

Production and characterization of the membranes.

In accordance with the technique described above, hollow fibers were spun from polyether-amide solutions as described in Example 1. The spinning solutions were prepared by stirring in PVP and appropriately diluting the polycondensation polyether-amide solution (i.e. without isolating the polymer or other purification and separation steps) with the solvent at between 20° C. and 80° C. and further stirring for 6 hours. The polymer solution was filtered through a 2 mm filter and then degassed. The hollow fibers were produced with dimensions of 215 mm internal diameter and 50 mm wall thickness. The fibers are washed with pyrogen-free water at elevated temperature (50°–80° C.), dried, steam-sterilized with saturated steam at 121° C. for 20 minutes and characterized in respect of their membrane efficiency. The following abbreviations have been used here:

| | |
|---|---|
| $Lp(H_2O)$ | Hydraulic permeability of completely desalinated water |
| $Lp(Alb)$ | Hydraulic permeability of a 6% strength albumin solution in water |
| $P(Cl)$ | Diffusive permeability as a measure of the urea clearance |
| $Sc(Myo)$ | Sieving coefficient for a 0.02% myoglobin solution |
| $Sc(Alb)$ | Sieving coefficient for a 6% strength albumin solution |

The Lp and P(Cl) values were measured by methods such as those described in "Evaluation of Hemodialysis and Dialysis Membranes", NIH publication 77–1294 (1977).

The Sc values were measured in accordance with DIN 58353, part 2 C3 (1988).

The properties of the membranes lie in the region of those of good high-flux dialysis membranes.

Example 3.1: Membranes of Polymer 1

For the membranes described in Table 2, the polycondensate of terephthalic acid dichloride/isophthalic acid dichloride in a molar ratio of 8:2 as the acid component and 2,2-bis[4-(4'-aminophenoxy)phenyl]propane as the diamine component was used as the polyether-amide (=Polymer 1, Example 1). The concentrations of polyether-amide and PVP used can be seen in Column 1 of Table 2. Water was used as the non-solvent system. The efficiency data of steam-sterilized membranes can be seen in particular from Table 2.

TABLE 1

| Polymer | Diamine 1 [kg] | Diamine 2 [kg] | NMP [kg] | TPC [kg] | IPC [kg] | Viscosity of the solution [mPas] | Limiting viscosity number[*) [dl/g] |
|---|---|---|---|---|---|---|---|
| 1 | 5.33 | — | 39.7 | 2.16 | 0.38 | 2800 | 0.98 |
| 2 | 3.73 | 0.98 | 28.4 | 3.58 | — | 13340 | 0.89 |
| 3 | 3.21 | 0.36 | 27.0 | 1.75 | 0.44 | 3700 | 0.83 |
| 4 | 5.34 | — | 39.7 | 2.54 | — | 3300 | 1.05 |

*)(NMP with 0.05% of LiBr, 25° C.)
Diamine 1 = 2,2'-bis[4-(4'-aminophenoxy)phenyl] propane
Diamine 2 = m-phenylenediamine
NMP = N-methylpyrrolidone
TPC = terephthalic acid dichloride
IPC = isophthalic acid dichloride

TABLE 2

Polyether-amide of {8:2 (terephthalic acid dichloride/isophthalic acid dichloride)}-
(2,2'-bis[4-(4'-aminophenoxy)phenyl]propane) polycondensate (Polymer 1, Example 1)

| Spinning solution composition[*)] [% by weight = P] | Lp [cm/s · bar · 10$^{-4}$] | | | P(Cl) [10$^{-4}$ cm/s] | Sc(Myo) after 15 min [%] | Sc(Myo) after 60 min [%] | Sc(Alb) [%] |
|---|---|---|---|---|---|---|---|
| | Lp(H$_2$O) | Lp(Alb) | Lp(H$_2$O) after contact with albumin | | | | |
| 11P of polyether-amide 3P of PVP K90 | 56 | 5.6 | 73 | 12.9 | 54 | 63 | 2.7 |
| 11P of polyether-amide 3P of PVP K90 2.5P of PVP K30 | 35 | 5.0 | 31 | 14.1 | 41 | 37 | 0.5 |
| 10P of polyether-amide 3P of PVP K90 | 62 | 5.3 | 57 | 15.9 | 53 | 60 | 2.5 |

[*)]Solvent: NMP; Non-solvent system: water
PVP = Polyvinylpyrrolidone

Example 3.2: Membranes of Polymer 2

Polymer 2 (Table 1, Example 1) was employed in Example 3.2. In particular, the steam-sterilized membrane of which the efficiency data were determined is a polyether-amide membrane of a polycondensate of terephthalic acid dichloride/isophthalic acid dichloride in a molar ratio of 8:2 as the acid component and 2,2'-bis[4-(4'-aminophenoxy)phenyl]propane/m-phenylenediamine in a molar ratio of 5:5 as the diamine component. The concentrations of polyether-amide and PCP used can be seen in column 1 of Table 3. The nonsolvent system comprises 70% by weight of water and 30% by weight of NMP. Table 3 contains the spinning parameters used and the efficiency data determined for the resulting membranes.

Example 3.3: Membranes of Polymer 3

Polymer 3 (Example 1, Table 1) was employed in Example 3.3. In particular, the steam-sterilized membrane is a polyether-amide membrane of a polycondensate of terephthalic acid dichloride/isophthalic acid dichloride in a molar ratio of 8:2 as the acid component and 2,2'-bis[4-(4'-aminophenoxy)phenyl]propane/m-phenylenediamine in a molar ratio of 7:3 as the diamine component. The concentrations of polyether-amide and PVP used can be seen as the composition of the spinning solution from column 1 in Table 4. Water was employed as the nonsolvent system. Table 4 contains the efficiency data determined on the resulting membranes.

TABLE 3

Polyether-amide of {8:2 (terephthalic acid/isophthalic acid)}-
{5:5 (2,2'-bis[4-(4'-aminophenoxy)phenyl]propane)/m-phenylenediamine} polycondensate

| Spinning solution composition[*)] [% by weight = P] | Lp [cm/s · bar · 10$^{-4}$] | | | P(Cl) [10$^{-4}$ cm/s] | Sc(Myo) after 15 min [%] | Sc(Myo) after 60 min [%] | Sc(Alb) [%] |
|---|---|---|---|---|---|---|---|
| | Lp(H$_2$O) | Lp(Alb) | Lp(H$_2$O) after contact with albumin | | | | |
| 11P of polyether-amide 2P of PVP K90 | 16 | 3.9 | 17 | 11.5 | 68 | 76 | — |

[*)]Solvent: NMP; nonsolvent system: 70% by weight of water and 30% by weight of NMP
PVP = Polyvinylpyrrolidone

TABLE 4

Polyether-amide of {8:2 (terephthalic acid/isophthalic acid)}-{7:3
(2,2'-bis[4-(4'-aminophenoxy)phenyl]propane)/m-phenylenediamine} polycondensate

| Spinning solution composition[*)] [% by weight = P] | Lp [cm/s · bar · 10$^{-4}$] | | | P(Cl) [10$^{-4}$ cm/s] | Sc(Myo) after 15 min [%] | Sc(Myo) after 60 min [%] | Sc(Alb) [%] |
|---|---|---|---|---|---|---|---|
| | Lp(H$_2$O) | Lp(Alb) | Lp(H$_2$O) after contact with albumin | | | | |
| 11P polyether-amide 3P PVP K90 | 73 | 6.8 | 80 | 8.25 | 83 | 92 | 16 |

TABLE 4-continued

Polyether-amide of {8:2 (terephthalic acid/isophthalic acid)}-{7:3 (2,2'-bis[4-(4'-aminophenoxy)phenyl]propane)/m-phenylenediamine} polycondensate

| Spinning solution composition[*) [% by weight = P] | Lp [cm/s · bar · $10^{-4}$] | | | P(Cl) [$10^{-4}$ cm/s] | Sc(Myo) after 15 min [%] | Sc(Myo) after 60 min [%] | Sc(Alb) [%] |
|---|---|---|---|---|---|---|---|
| | Lp(H$_2$O) | Lp(Alb) | Lp(H$_2$O) after contact with albumin | | | | |
| 11P polyether-amide 2P PVP K90 | 24 | 4.3 | 14 | 11.2 | 20 | 22 | 0.9 |
| 11P polyether-amide 1P PVP 90 | 88 | 5.5 | 66 | 10.5 | 71 | 76 | 6.8 |

[*)Solvent: NMP; nonsolvent system: water
PVP = Polyvinylpyrrolidone

Example 4

The spinnability of polyether-amide solutions of Polymer 1 (Example 1) comprising {8:2 (terephthalic acid dichloride/ isophthalic acid dichloride)}-(2,2'-bis[4-(4'-aminophenoxy) phenyl]propane) polycondensate, which was prepared with and without addition of CaCl$_2$, was investigated in Example 4 (Table 5). The calcium chloride extract is furthermore stated for two cases. It can be seen that the release of CaCl$_2$ from membranes spun from solutions which have been prepared in salt-free form is significantly lower than that from membranes which have been spun using salt-containing solutions.

TABLE 5

Spinnability of polyether-amide solutions of Polymer 1 (cf. Table 1) with and without addition of a salt and calcium chloride extracts thereof

| Spinning solution composition | Viscosity [mPa · s] | Spinning rate [m/min] | Filtration time with respect to a 2 μm Nuprofilter[*) [%] | Calcium chloride extract according to GF[**) [mg/Filter] |
|---|---|---|---|---|
| 10P of Polyether-amide 3P of PVP K90 3P of CaCl$_2$ | 12600 | 20–22 | 100 | |
| 10P of polyether-amide 3P of PVP K90 | 2700 | >40 | 10–15 | |
| 10.2P of polyether amide (T34) 3P of PVP K90 3P of CaCl$_2$[***) | 12980 | 25 | | 32 |
| 11P of polyether amide (T34) 3P of PVP K90[***) | 2960 | 38 | | <0.5 |

[*)Order No. SS-6FW-MM, 2 μm, B.E.S.T (Pliezhausen)
[**)Extraction conditions: 1 dialysis bundle with a membrane area of 1.4 m$^2$ and a dry weight of 20 g is extracted with completely desalinated water (200 ml) at 60° C. for 16 hours and CaCl$_2$ is determined by ion chromatography.
[***)Precipitating medium: 70% of H$_2$O + 30% of NMP
PVP = polyvinylpyrrolidone

Example 5

The complement activation and the cytotoxicity were investigated with the aid of Polymer 1 in Example 5.

For the polyether-amide from {8:2 (terephthalic acid dichloride/isophthalic acid dichloride)} and 2,2'-bis[4-(4'-aminophenoxy)phenyl]propane, the blood tolerability is quantified in Table 6 by the complement activation as the TCC value compared with other customary dialysis membranes.

TABLE 6

Blood tolerability measured by complement activation as TCC generation in human plasma compared with conventional dialysis membranes

| Membrane | TCC generation during plasma contact for 20 minutes [ng/ml·min] |
|---|---|
| Polyether-amide | 13–79 |
| Cuprophan ® (Akzo) | 560–2200 |

TABLE 6-continued

Blood tolerability measured by complement activation as TCC generation in human plasma compared with conventional dialysis membranes

| Membrane | TCC generation during plasma contact for 20 minutes [ng/ml·min] |
|---|---|
| Polyamide (Gambro) | 13–21 |

[*)Membrane area 310 cm$^2$
Method according to R. Deppisch, Kidney International, 37, 696 (1990)

It can be seen clearly from this that the polyether-amide is on the same level as the well-proven polyamide membrane. The cytotoxicity was determined with the same polyether-amide by determination of the inhibition by the ICG test SF/6TI-014. No inhibition in cell growth was found here.

Further advantages and embodiments of the invention can be seen from the following patent claims.

We claim:

1. A process for the preparation of a polyether-amide solution in which one or more dicarboxylic acid derivatives of the formula I

in which

Ar is a divalent, aromatic or heteroaromatic radical, the two carbonyl groups being on non-adjacent ring carbon atoms and the Ar radical selected is optionally substituted by one or two branched or unbranched radicals from the group consisting of $C_1$–$C_3$-alkyl, $C_1$–$C_3$-alkoxy, aryl, aryloxy, $C_1$–$C_6$-perfluoroalkyl and $C_1$–$C_6$-perfluoroalkoxy radicals, fluorine, chlorine, bromine and/or iodine, are subjected to a polycondensation reaction with one or more aromatic diamines of the formula II

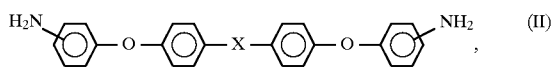

in which

X is a group —C(CH$_3$)$_2$—, —C(CF$_3$)$_2$, —CO—, —SO—, —SO$_2$—, —CH$_2$—, —S—, or —O— or a direct bond, and optionally up to 50 mol % of the diamines II are replaced by m-phenylenediamine, in aprotic polar solvents, which comprises passing ammonia in an amount sufficient to neutralize the HCl formed into the polymer solution obtained after the end of the polycondensation and filtering off the ammonium salt formed.

2. The process as claimed in claim 1, wherein the polymer solution obtained after filtration is further processed without isolation of the polymer.

3. The process as claimed in claim 1, wherein amide compounds are employed as the solvent for the polycondensation reaction.

4. The process as claimed in claim 3, wherein N-methyl-2-pyrrolidone (NMP) or N,N-dimethylacetamide is used as the solvent.

5. The process as claimed in claim 1, wherein a polymer solution having a residual content of <0.1% of chloride is obtained.

6. The process as claimed in claim 1, wherein the amount of monomers to be subjected to polycondensation is chosen such that the concentration of the polymer in the solution is from about 3 to about 50% by weight.

7. A semipermeable, porous, asymmetric membrane comprising a polyaramid containing, as structural repeating units, one or more structural units of the formula I'

in which

Ar is a divalent, aromatic or heteroaromatic radical, the two carbonyl groups being on non-adjacent ring carbon atoms and the Ar radical is optionally substituted by one or two branched or unbranched radicals selected from the group consisting of $C_1$–$C_3$-alkyl, $C_1$–$C_3$-alkoxy, aryl, aryloxy, $C_1$–$C_6$-perfluoroalkyl and $C_1$–$C_6$-perfluoroalkoxy radicals, fluorine, chlorine, bromine and/or iodine, and, based on the sum of (II') and (III'), to the extent of 50 to 100 mol %, structural units of the formula (II')

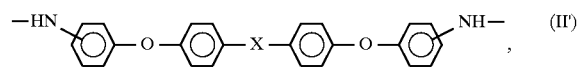

in which

X is a group —C(CH$_3$)$_2$—, —C(CF$_3$)$_2$, —CO—, —SO—, —SO$_2$—, —CH$_2$—, —S—, or —O— or a direct bond, and, based on the sum of (II') and (III') 0 to 50 mol %, structural units of the formula (III')

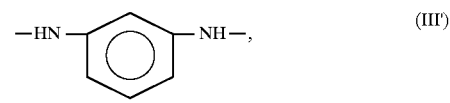

the membrane being obtained by the phase inversion process, in which a homogeneous polymer solution is brought into contact with a precipitating bath containing a precipitating liquid, the precipitating liquid being miscible with the solvent of the polymer solution and the polymers dissolved in the polymer solution being precipitated as a membrane, wherein the polymer solution has a chloride content of less than 0.1% by weight, based on the total weight of the polymer solution.

8. A membrane as claimed in claim 7, which is arranged on a support layer which is made of a synthetic nonwoven and is permeable to media which are capable of flow, or on a fabric.

9. A membrane as claimed in claim 8, which is a hollow fiber membrane.

10. A process for the production of a semipermeable, porous, asymmetric membrane in which a solution comprising a polymer of at least one polyaramid containing, as structural repeating units, one or more structural units of the formula I'

in which

Ar is a divalent, aromatic or heteroaromatic radical, the two carbonyl groups being on non-adjacent ring carbon atoms and the Ar radical is optionally substituted by one or two branched or unbranched radicals selected from the group consisting of $C_1$–$C_3$-alkyl, $C_1$–$C_3$-alkoxy, aryl, aryloxy, $C_1$–$C_6$-perfluoroalkyl and $C_1$–$C_6$-perfluoroalkoxy radicals, fluorine, chlorine, bromine and/or iodine, and, based on the sum of (II') and (III') 50 to 100 mol %, structural units of the formula (II')

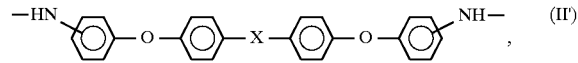

in which

X is a group —C(CH$_3$)$_2$—, —C(CF$_3$)$_2$, —CO—, —SO—, —SO$_2$—, —CH$_2$—, —S—, or —O— or a direct bond, and, based on the sum of (II') and (III'), to the extent of 0 to 50 mol %, structural units of the formula (III')

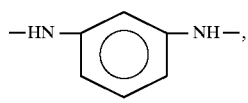 (III')

is brought into contact with a precipitating bath containing a precipitating liquid, the precipitating liquid being miscible with the solvent of the polymer solution and the polymers dissolved in the polymer solution being precipitated as a membrane, where the process comprises employing as polymer solution a solution obtained by polycondensation as claimed in claim 1.

11. A process as claimed in claim 10, wherein the solution resulting from the polycondensation is used for membrane production by the phase inversion process without isolation of the polymer.

12. In a method for producing semipermeable, porus and asymmetric membranes, the improvement which comprises using a polymer solution according to claim 1.

13. The method according to claim 12, wherein membrane is a hollow fiber membrane.

14. The method according to claim 12, wherein the membrane is a flat membrane.

* * * * *